United States Patent [19]

Brooks

[11] Patent Number: 4,575,998
[45] Date of Patent: Mar. 18, 1986

[54] HARVESTER COMB FINGERS

[76] Inventor: Donald G. Brooks, 12 O'Malley St., Osborne Park, Australia, 6017

[21] Appl. No.: 716,058

[22] Filed: Mar. 26, 1985

[30] Foreign Application Priority Data

Mar. 26, 1984 [AU] Australia .............................. PG4250

[51] Int. Cl.⁴ ............................................. A01D 55/12
[52] U.S. Cl. ......................................... 56/312; 56/310
[58] Field of Search .................................. 56/307–312

[56] References Cited

U.S. PATENT DOCUMENTS

| | | | |
|---|---|---|---|
| 1,815,491 | 7/1931 | Braasch et al. | 56/312 |
| 2,394,838 | 2/1946 | Beltt | 56/312 |
| 2,484,704 | 10/1949 | Girodat | 56/312 |
| 2,576,122 | 11/1951 | Keuison | 56/312 |
| 2,707,365 | 5/1955 | Decher | 56/312 |
| 2,746,230 | 5/1956 | Reimer | 56/312 |
| 3,313,095 | 4/1967 | Gaterman | 56/312 |

Primary Examiner—Robert P. Swiatek
Assistant Examiner—John G. Weiss
Attorney, Agent, or Firm—Townsend and Townsend

[57] ABSTRACT

Flexible and resilient knock-on extension fingers of polymeric material, the extension fingers being provided with surfaces which partly envelop the metal fingers of a comb, and also with latch surfaces which engage latching abutment surfaces which are fixed with respect to those comb fingers.

6 Claims, 5 Drawing Figures

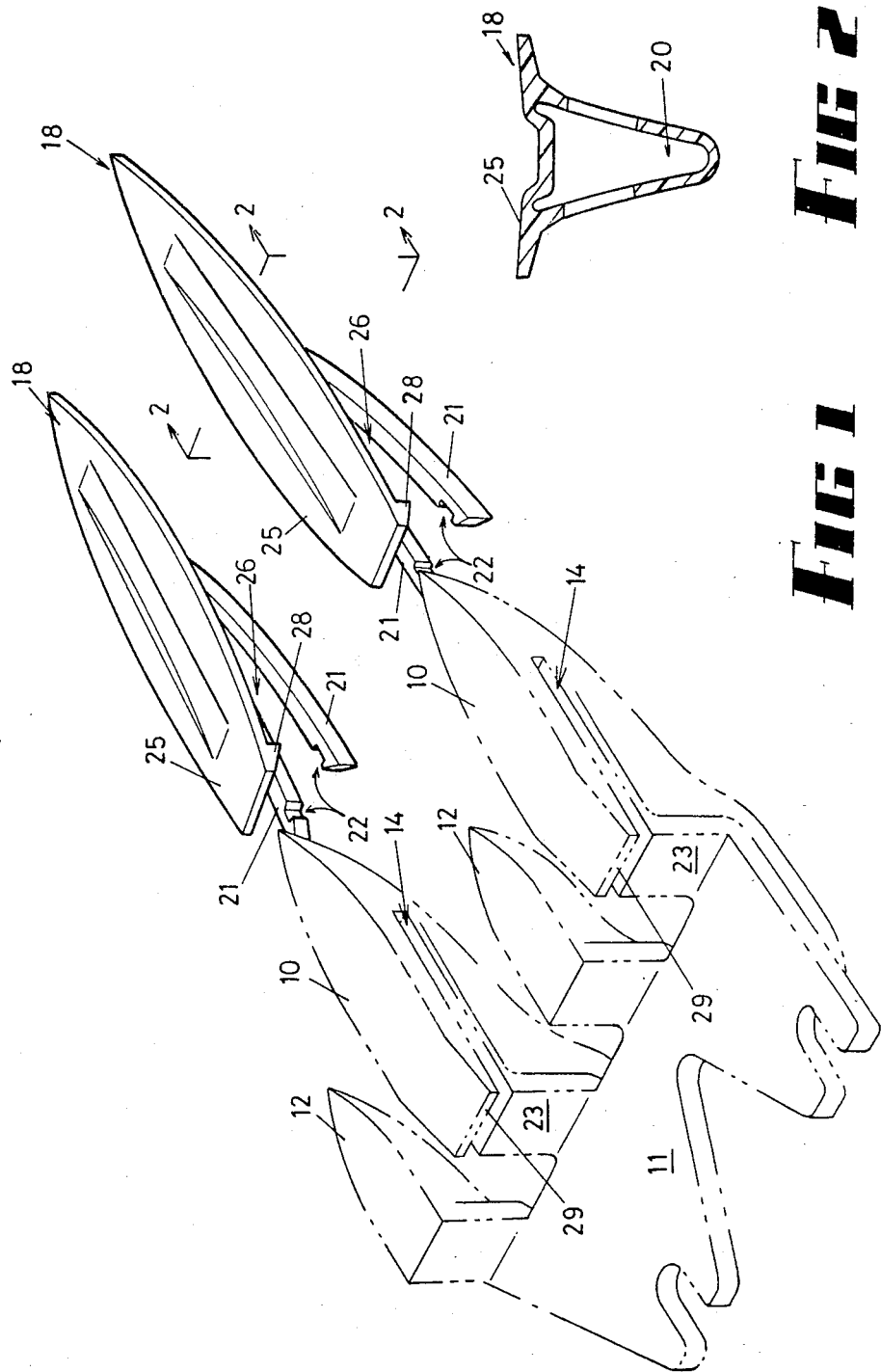

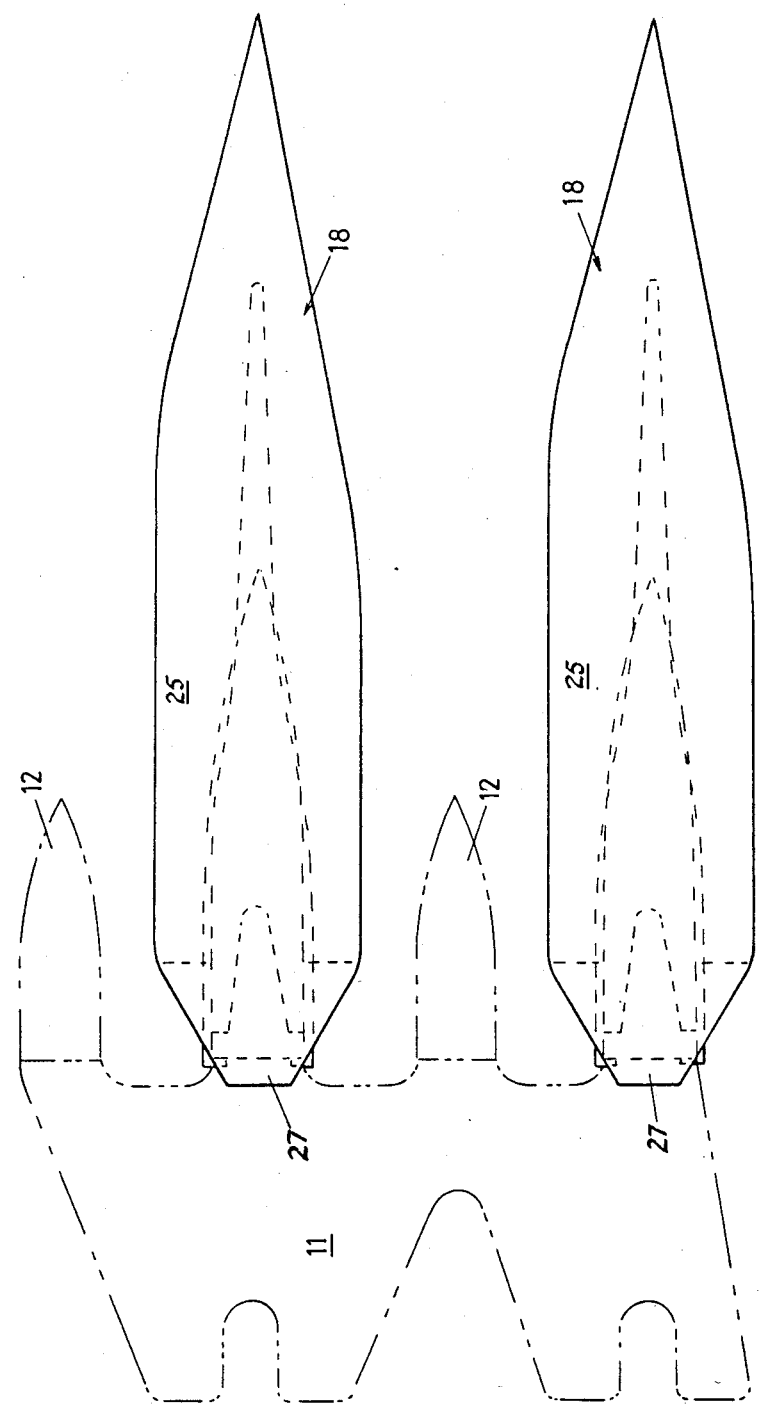

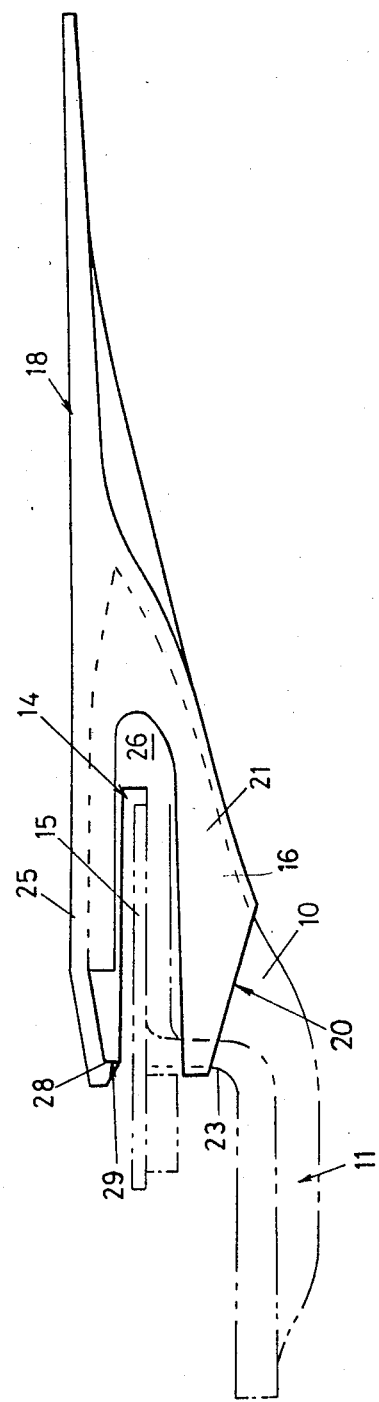

HARVESTER COMB FINGERS

This invention relates to improvements in grain harvester comb finger extensions which are arranged to extend forwardly from the metal knife-guard fingers which form portion of the cutter bar/harvester comb assembly.

BACKGROUND OF THE INVENTION

Heretofore use has been made of bolt-on extension fingers which extend forwardly from the harvester comb of a grain harvesting machine, since under certain conditions which are sometimes encountered (for example, light, shatter prone and in some cases tangled crops) it is advantageous to assist guidance of the crop into the fingers which embody the cutter bar severing surfaces, thus reducing shatter and other losses. However there are some problems which are encountered in that metal finger extensions can sometimes be caused to bend or fracture and pass rearwardly into the harvester machine, and may smash some elements of that machine, for example the auger which is usually located rearwardly of the comb, or the thresher drum.

BRIEF SUMMARY OF THE INVENTION

With the object of providing comb finger extensions which are less likely to cause mechanical damage to a harvester, in this invention there are provided flexible and resilient knock-on extension fingers of polymeric material, the extension fingers being provided with surfaces which partly envelop the metal fingers of a comb, and also with latch surfaces which engage latching abutment surfaces on or attached to those comb fingers. Since the material is flexible and resilient, danger of damage to the machine is substantially reduced. Since latches are provided which will engage behind latching abutment surfaces of (or attached to) the comb metal fingers, danger of dislodgement is also reduced without the need to separately bolt on the finger extensions.

More specifically, the invention consists of an upper portion, a lower portion, an aperture in the lower portion the surface walls of which are complementary in size and shape to the knife guard finger so that the finger extension can fit in a glove-like manner over the front end of the knife guard finger, the lower portion comprising at least one rearwardly extending latching portion engageable with an abutment surface at the rear part of the knife guard finger, said finger extension being of flexible and resilient polymeric material.

BRIEF DESCRIPTION OF THE DRAWINGS

An embodiment of the invention is described hereunder in some detail with reference to, and is illustrated in, the accompanying drawings, in which FIG. 1 is a perspective "exploded" view showing a typical grain harvester comb finger casting, and finger extensions which are positionable over the comb fingers thereof, FIG. 2 is a section through a finger extension taken on plane 2-2-2 of FIG. 1.

FIG. 3 is a plan view of a comb finger casting with two finger extensions thereon, FIG. 4 is a side elevation of FIG. 3.

Figure 5:
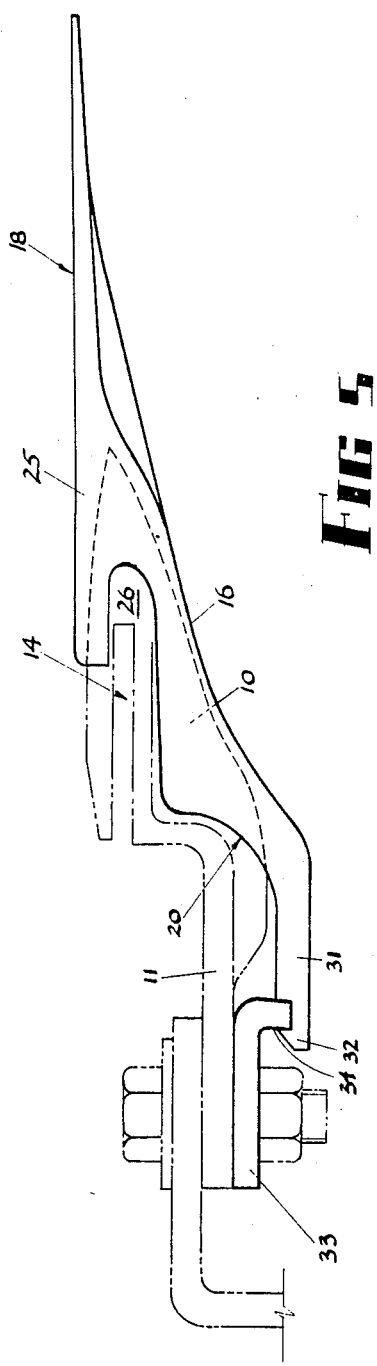
FIG. 5 is a side elevation of an alternative embodiment.

In this embodiment the knife guard fingers 10 of an open cut grain harvester are substantially in accordance with prior art, comprising a plurality of castings 11, each casting 11 having two knife guard fingers 10 and two alternate supplementary ("filler") fingers 12, each knife guard finger 10 having a cutter bar slot 14 which contains a reciprocating cutter bar 15 (FIG. 4 only).

There are provided extension fingers 18, one on each knife guard finger 10, and each finger 18 is formed from flexible and resilient polymeric material and has an upper portion 25, a lower portion 16, an aperture 20 in lower portion 16, the surface walls of which are complementary in size and shape to a knife guard finger 10 so that portion of the forwardly extending polymeric fingers fit in glove-like manner over portions of the knife guard fingers, (and, where applicable, over corresponding portions of the filler fingers). However this in itself is not sufficient to ensure retention of the extension fingers, and in order to achieve this each extension finger 18 is bifurcate, having a pair or rearwardly extending latching portions 21 each terminating in an inturned latch notch 22 which latches over an abutment surface 23 at the rear end of the knife guard finger 10 to which it is attached. This latching is beneath the knife slot 14, and is effected by lateral movement of the latching portions 21.

The upper portion 25 of each extension finger 18 also has a rearward extension 27 which is above the latching portions 21, and a space 26 exists between that rearward extension and portions 21 and 25, and this space is also a cutter bar slot which accommodates the cutter bar 15.

The rearward extension of portion 25 terminates at its rear end in a downwardly facing secondary latch 28 which latches over the abutment surface 29 at the rear end of upper portion 25, the latching being effected by a vertically downward movement of the upper portion 25. Thus, not only is extension finger 18 resilient, and unlikely to damage the machinery if it is carried rearwardly, but it is retained to its knife guard finger, firstly by the glove-like engagement of surfaces of aperture 20, secondly by lateral movement (in opposite directions) of the two latching portions 21, and also by latch 28. This provides a high degree of security.

Extension fingers may be quickly and easily positioned by an operator pushing them rearwardly over the knife guard fingers. Removal can also be effected easily, by resilient deformation of the latch portions, and applying a forward force to the extension fingers.

Although the description herein has been restricted to an embodiment wherein the finger extensions are all separate, clearly they can be in multiple form, and for example, a pair of finger extensions can be comprised in a single, or monolithic, moulding, for use on knife guard fingers described and illustrated herein.

In some instances, knife guard fingers do not embody latch abutment surfaces, and in those instances it is necessary to provide such surfaces by means of bolt-on plates or angle section bars, these being secured by the same bolts used for securing the fingers.

In the embodiment of FIG. 5, as in the first embodiment, the extension finger 18 fits over the knife guard finger 10 in a glove-like manner, but, instead of latching top and sides, a rearward extension 31 of the lower portion 16 terminates in a latch 32 which resiliently engages an abutment surface 34 of a latch bar 33 bolted to the underside of casting 11.

What is claimed is:

1. A grain harvester comb finger extension for a knife guard finger of a cutter bar/harvester comb assembly, comprising an upper portion, a lower portion, an aperture in the lower portion the surface walls of which are complementary in size and shape to the knife guard finger so that the finger extension can fit in a glove-like manner over the front end of the knife guard finger, the lower portion comprising at least one rearwardly extending latching portion engageable with an abutment surface at the rear end of the knife guard finger, said finger extension being of flexible and resilient polymeric material.

2. A grain harvester comb finger extension for a knife guard finger of a cutter bar/harvester comb assembly according to claim 1 wherein said lower portion comprises two said rearwardly extending latching portions which are spaced from one another laterally, each latching portion having surfaces defining a latch notch at its rear end, said latch notches being engageable over the rear end of the knife guard finger.

3. A grain harvester comb finger extension for a knife guard finger of a cutter bar/harvester comb assembly according to claim 2 wherein said latch notches face each other, and are engageable over opposite sides of the rear end of the knife guard finger upon lateral movement of both said rearwardly extending latching portions.

4. A grain harvester comb finger extension for a knife guard finger of a cutter bar/harvester comb assembly according to claim 1 further comprising a rearward extension of said upper portion having a secondary latch which is also engageable with an abutment surface at said rear end of the knife guard filler upon vertical movement of said upper portion.

5. A grain harvester comb finger extension for a knife guard finger of a cutter bar/harvester comb assembly according to claim 4 wherein a space exists between the rearward extension of the upper portion and the rearwardly extending latching portions, said space being a cutter slot through which the cutter bar extends when the finger extension is on the knife guard finger.

6. A grain harvester comb finger extension for a knife guard finger of a cutter bar/harvester comb assembly according to claim 1 wherein said lower portion further comprises a rearward extension terminating in a latch, and a latch bar fixed with respect to the knife guard finger having an abutment surface engaged by said latch.

* * * * *